US010180105B2

(12) United States Patent
Peters

(10) Patent No.: US 10,180,105 B2
(45) Date of Patent: *Jan. 15, 2019

(54) ADJUSTABLE CABLE FOR EXHAUST DUCT LINER HANGER

(71) Applicant: United Technologies Corporation, Hartford, CT (US)

(72) Inventor: Donald W. Peters, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 261 days.

This patent is subject to a terminal disclaimer.

(21) Appl. No.: 14/850,382

(22) Filed: Sep. 10, 2015

(65) Prior Publication Data

US 2015/0377137 A1 Dec. 31, 2015

Related U.S. Application Data

(63) Continuation of application No. 13/586,623, filed on Aug. 15, 2012, now Pat. No. 9,157,394.

(51) Int. Cl.
*F02C 7/20* (2006.01)
*F02K 1/82* (2006.01)
(Continued)

(52) U.S. Cl.
CPC ............... *F02C 7/20* (2013.01); *B64D 27/26* (2013.01); *F01D 9/023* (2013.01); *F01D 25/28* (2013.01);
(Continued)

(58) Field of Classification Search
CPC . F01D 9/023; F01D 25/28; F02C 7/20; F02K 1/04; F02K 1/822; F02K 1/82;
(Continued)

(56) References Cited

U.S. PATENT DOCUMENTS

| 1,293,383 A | * | 2/1919 | Eaton | F16G 11/12 |
| | | | | 14/22 |
| 2,500,415 A | * | 3/1950 | Johnson | B60N 3/023 |
| | | | | 105/354 |

(Continued)

OTHER PUBLICATIONS

Examination Report for EP Application 12197094.1, dated Oct. 31, 2017, 7 pages.

*Primary Examiner* — Scott Walthour
(74) *Attorney, Agent, or Firm* — Kinney & Lange, P. A.

(57) ABSTRACT

A hanger includes a connector assembly for coupling the hanger to a first annular duct, a bracket for coupling the hanger to a second annular duct concentrically disposed within the first annular duct, and a cable formed by a plurality of wires bound together that extend from the connector assembly to the bracket. A plurality of circumferentially-spaced hangers placed in tension support an exhaust duct liner relative to an exhaust duct. The hangers permit circumferential and axial displacement at each hanger of the exhaust duct liner relative to the exhaust duct. The displacement of the exhaust duct liner relative to the exhaust duct at each hanger is permitted in a first radial direction that decreases tension in the cable and is restrained in a second radial direction that increases tension in the cable.

19 Claims, 5 Drawing Sheets

(51) Int. Cl.
*F23R 3/00* (2006.01)
*F01D 9/02* (2006.01)
*F16L 3/00* (2006.01)
*F16M 11/14* (2006.01)
*F16B 5/06* (2006.01)
*F23R 3/60* (2006.01)
*F16L 3/16* (2006.01)
*F16L 3/14* (2006.01)
*F16L 3/20* (2006.01)
*F16L 3/18* (2006.01)
*F01D 25/28* (2006.01)
*F16L 3/123* (2006.01)
*B64D 27/26* (2006.01)
*F16L 3/133* (2006.01)
*F16M 11/12* (2006.01)
*F02K 1/04* (2006.01)

(52) U.S. Cl.
CPC ............... *F02K 1/04* (2013.01); *F02K 1/82* (2013.01); *F02K 1/822* (2013.01); *F16B 5/065* (2013.01); *F16B 5/0621* (2013.01); *F16L 3/00* (2013.01); *F16L 3/006* (2013.01); *F16L 3/123* (2013.01); *F16L 3/1233* (2013.01); *F16L 3/133* (2013.01); *F16L 3/14* (2013.01); *F16L 3/16* (2013.01); *F16L 3/18* (2013.01); *F16L 3/20* (2013.01); *F16M 11/12* (2013.01); *F16M 11/14* (2013.01); *F23R 3/002* (2013.01); *F23R 3/60* (2013.01); *B64D 2027/266* (2013.01); *B64D 2027/268* (2013.01); *F05D 2260/30* (2013.01)

(58) Field of Classification Search
CPC .... F05D 2260/30; F16B 5/0621; F16B 5/065; F16L 3/00; F16L 3/006; F16L 3/123; F16L 3/1233; F16L 3/133; F16L 3/14; F16L 3/16; F16L 3/18; F16L 3/20; F16M 11/12; F23R 3/002; F23R 3/60; B64D 27/26; B64D 2027/266; B64D 2027/268
See application file for complete search history.

(56) References Cited

U.S. PATENT DOCUMENTS

| | | | |
|---|---|---|---|
| 2,571,052 A * | 10/1951 | Mount | F16G 11/02 403/57 |
| 2,946,510 A | 7/1960 | Galvin | |
| 3,429,607 A * | 2/1969 | White | E04B 1/4142 294/89 |
| 3,486,771 A | 12/1969 | Conlin | |
| 3,719,349 A | 3/1973 | Dulaney | |
| 3,837,411 A | 9/1974 | Nash et al. | |
| 3,981,115 A | 9/1976 | Hoyer | |
| 4,079,981 A * | 3/1978 | Mahler | B64D 27/26 244/54 |
| 5,020,296 A * | 6/1991 | Aoshika | F21V 21/04 29/433 |
| 5,059,055 A | 10/1991 | DeGress et al. | |
| 5,088,279 A | 2/1992 | MacGee | |
| 5,265,409 A | 11/1993 | Smith, Jr. et al. | |
| 5,417,400 A | 5/1995 | Arakawa | |
| 6,536,750 B1 | 3/2003 | Martin | |
| 7,581,399 B2 | 9/2009 | Farah et al. | |
| 7,600,789 B2 | 10/2009 | Vyse et al. | |
| 7,721,522 B2 | 5/2010 | Farah et al. | |
| 7,788,899 B2 | 9/2010 | Smith | |
| 7,854,586 B2 | 12/2010 | Major et al. | |
| 7,861,535 B2 | 1/2011 | Figueroa et al. | |
| 7,866,158 B2 | 1/2011 | Murphy | |
| 7,883,306 B2 * | 2/2011 | Draney | B64C 1/1423 244/118.3 |
| 8,127,526 B2 | 3/2012 | Murphy et al. | |
| 9,157,394 B2 * | 10/2015 | Peters | F02K 1/04 |
| 9,309,834 B2 * | 4/2016 | Peters | F02K 1/822 |
| 2004/0244634 A1 | 12/2004 | Pugin et al. | |
| 2005/0151370 A1 | 7/2005 | Vyse et al. | |
| 2007/0164566 A1 | 7/2007 | Patel | |
| 2009/0077978 A1 | 3/2009 | Figueroa et al. | |
| 2009/0293498 A1 | 12/2009 | Petty et al. | |
| 2011/0016880 A1 | 1/2011 | Roberts et al. | |
| 2013/0319007 A1 | 12/2013 | Peters | |

* cited by examiner

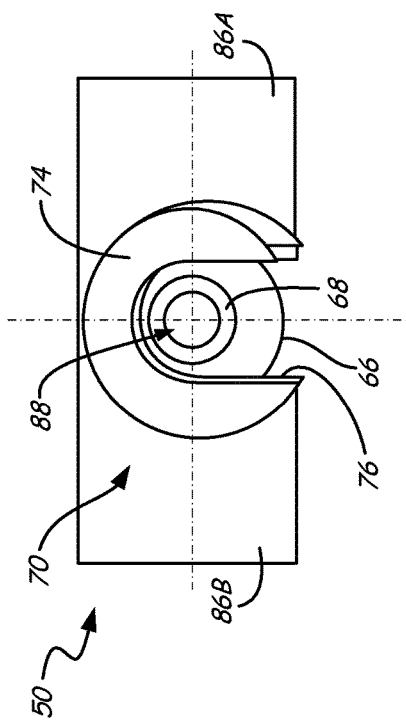
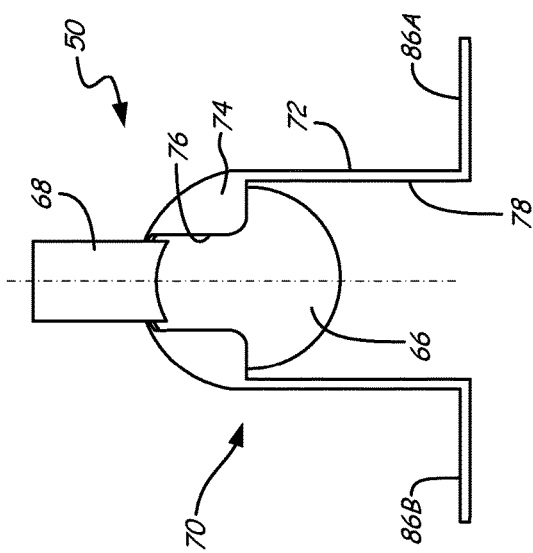

ADJUSTABLE CABLE FOR EXHAUST DUCT LINER HANGER

CROSS-REFERENCE TO RELATED APPLICATIONS

This is a continuation of U.S. patent application Ser. No. 13/586,623, filed Aug. 15, 2012.

BACKGROUND

This invention relates generally to gas turbine engines and more particularly to exhaust duct liner attachment systems and methods. In gas turbine engines, it is necessary to protect exhaust ducts with an insulating shield in order to prevent heated core gases from damaging the exhaust ducts. Typically, exhaust ducts are made from titanium-based alloys and have temperature limits of approximately 300° F.-800° F. (~148.9° C.-426.7° C.). Exhaust gases, however, may reach much higher temperatures, particularly if thrust augmentation is conducted. It is, therefore, necessary to line exhaust ducts with a material that is capable of withstanding the peak temperatures of the core gases and that prevents the exhaust duct from reaching its temperature limitations. Exhaust duct liners are typically made from nickel-based alloys, which have temperature limits of approximately 700° F.-1200° F. (~371.1° C.-648.9° C.). In order to alleviate some of the heat from the exhaust gases imparted to the liner, cooling air is passed between the exhaust duct and liner and is bled through thousands of small cooling holes in the liner. For example, bypass air is routed between the duct and liner in turbofan engines. Thus, the exhaust duct and liner are subjected to different pressure and temperature gradients, which results in differing deflections and expansions of each body.

In order to maintain the desired temperature and pressure profile along the exhaust duct and liner, it is desirable to maintain proper spacing between the exhaust duct and liner. The differing pressures, temperatures and functional requirements of the exhaust duct, however, produce three-dimensional forces between the duct and liner, which tend to shift the liner out of alignment. Various designs have been put forth to maintain proper alignment, such as described in U.S. Pat. Nos. 7,581,399 and 7,861,535, which are assigned to United Technologies Corporation. Some of these designs, however, require careful insertion of support members through holes in either the exhaust duct or liner. There is, therefore, a need for an easy to install exhaust duct liner suspension system that maintains proper spacing between an exhaust duct and a duct liner, while also permitting the liner to shift in other directions to accommodate, among other things, thermal growth.

SUMMARY

A hanger comprises a connector assembly, a bracket, and a cable. The connector assembly is configured to be coupled to a first annular duct. The bracket is configured to be coupled to a second annular duct concentrically disposed within the first annular duct. The cable is formed by a plurality of wires bound together that extend from the connector assembly to the bracket. The cable is placed in tension to support the second annular duct relative to the first annular duct.

A plurality of circumferentially-spaced hangers for use in a gas turbine engine exhaust system, each hanger comprising a connector assembly for connecting to an exhaust duct of the gas turbine engine, a bracket for connecting to an exhaust duct line of the gas turbine exhaust system, and a cable extending from the connector assembly to the bracket. The cable is placed in tension to support the exhaust duct line relative to the exhaust duct. The displacement of the exhaust duct liner relative to the exhaust duct is permitted at each hanger in a first radial direction that decreases tension in the cable and is restrained in a second radial direction that increases tension in the cable.

BRIEF DESCRIPTION OF THE DRAWINGS

FIG. 4A is a top view of the rotating joint of FIG. 2 showing a ball engaging a retention slot in a housing.

FIG. 4B is a side view of the rotating joint of FIG. 2 showing a ball inserted into an access opening in the housing.

DETAILED DESCRIPTION

Figure 1:
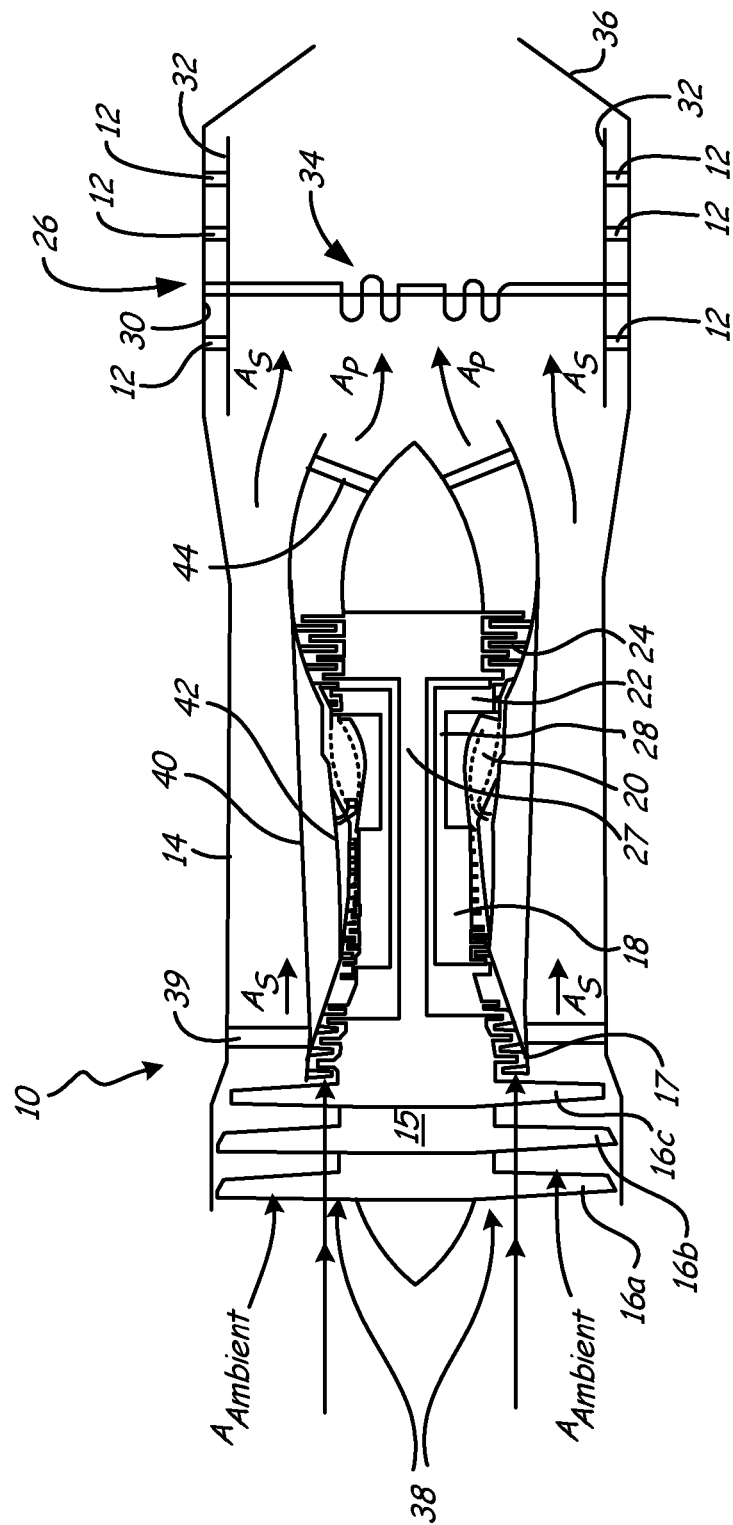
FIG. 1 is a schematic diagram of a dual-spool, low-bypass ratio turbofan engine having an exhaust duct liner supported within an exhaust duct using hangers having adjustable cable assemblies of the present invention.

FIG. 1 shows a schematic diagram of dual-spool, low-bypass ratio turbofan engine 10, in which hangers 12 of the present invention can be used. Although, in other embodiments, the present invention is applicable to other types of gas turbine engines such as high-bypass ratio turbofans including turbofans using fan drive gear systems. Turbofan engine 10 also includes fan duct 14, drive fan 15 (including stages 16a-16c), low pressure compressor 17, high pressure compressor 18, combustor 20, high pressure turbine 22, low pressure turbine 24 and exhaust system 26. Drive fan 15 and low pressure compressor 17 are driven by low pressure turbine 24 with shaft 27. High pressure compressor 18 is driven by high pressure turbine 22 with shaft 28. High pressure compressor 18, combustor 20, high pressure turbine 22 and shaft 28 comprise the core of turbofan engine 10, which produces the high energy air stream that is ultimately used to drive low pressure turbine 24 and provide high pressure flow to produce thrust via both primary air $A_P$ and secondary air $A_S$. Exhaust system 26 includes exhaust duct 30, liner 32, augmentation system 34 and exhaust nozzle 36. Exhaust system 26 also includes hangers 12, which include adjustable cable assemblies of the present invention. Hangers 12 are disposed in multiple circumferential arrays to maintain liner 32 mounted within exhaust duct 30. FIG. 1 shows three, axial sequential arrays of hangers 12. However, liner 32 may be supported by many more arrays wherein the total number of hangers numbers in the hundreds.

Ambient air $A_{Ambient}$ enters engine 10 at inlet 38 through drive fan 15. Drive fan 15 is rotated by low pressure turbine 24 to accelerate ambient air $A_{Ambient}$ thereby producing a major portion of the thrust output of engine 10. Accelerated ambient air $A_{Ambient}$ is divided into two streams of air:

primary air $A_P$ and secondary air $A_S$. Secondary air $A_S$, also known as bypass air, passes through fan exit guide vanes 39 and between fan duct 14 and aft duct 40 where it passes on to exhaust system 26. Thus, the principal function of secondary air $A_S$ is the production of thrust from drive fan 15. Secondary air $A_S$ also serves to cool exhaust duct liner 32 from primary air $A_P$. Primary air $A_P$, also known as hot air, is a stream of air that is directed first into low pressure compressor 17 and then into high pressure compressor 18 within engine case 42. Pressurized primary air $A_P$ is then passed into combustor 20 where it is mixed with a fuel supply and ignited to produce high energy gasses, as is known in the art. The high energy gasses are used to turn high pressure turbine 22 and low pressure turbine 24. Turbine 22 drives compressor 18 with shaft 28, while turbine 24 drives compressor 17 and drive fan 15 with shaft 27. Primary air $A_P$ passes from engine case 42 to exhaust system 26 through exit guide vanes 44.

Mixed combusted primary air $A_P$ and bypassed secondary air $A_S$ are passed into exhaust duct 30 of exhaust system 26. As is known in the art, a secondary combustion process can be carried out using augmentation system 34 within liner 32. The augmentation process elevates the speed and temperature of the mixed exhaust gas to further produce thrust using exhaust nozzle 36. Liner 32, which is suspended from exhaust duct 30 with hangers 12, prevents overheating of duct 30 from the secondary combustion process. Hangers 12 allow liner 32 to shift within exhaust duct 30 to accommodate different thermal expansion rates between liner 32 and duct 30, while accommodating different temperature gradients throughout exhaust system 26. Hangers 12 incorporate adjustable cable assemblies that permit radial, circumferential and axial displacement of liner 32 within duct 30 without inducing additional stress. The adjustable cable assemblies of hangers 12 also facilitate expedient assembly of liner 32 within exhaust duct 30.

Figure 2:
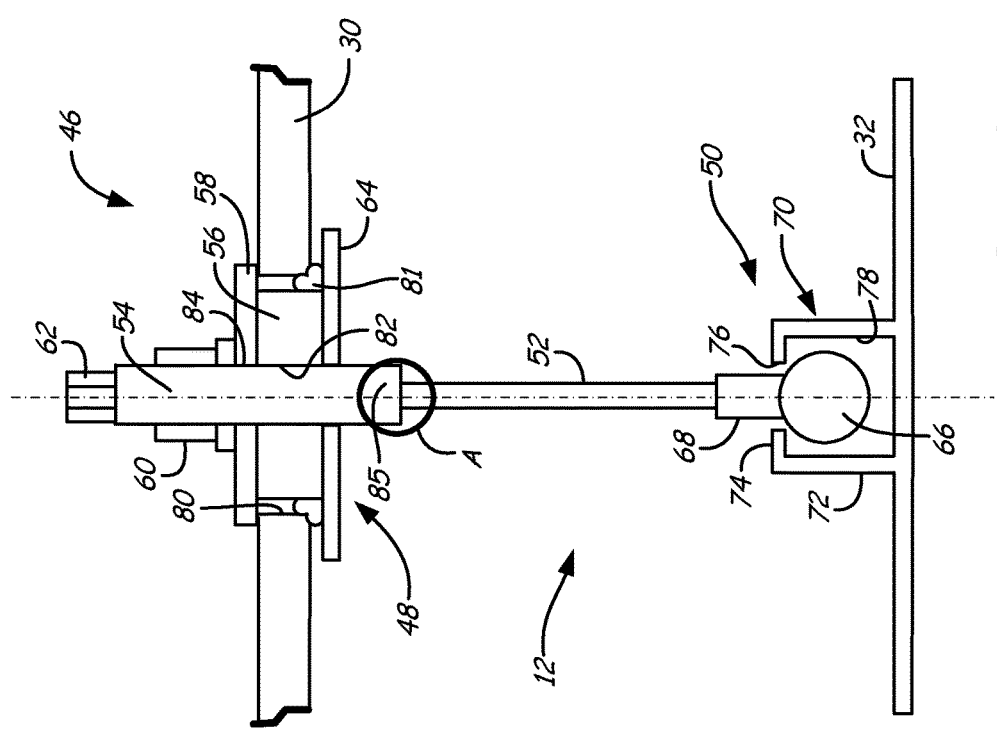
FIG. 2 is a side view of the adjustable cable assembly of the present invention having a connector assembly connecting to a cut-away portion of an exhaust duct and a rotating joint connected to a cut-away portion of an exhaust duct liner.

FIG. 2 is a partial cross-sectional side view of adjustable cable assembly 46 of the present invention having connector assembly 48 connecting to a cut-away portion of exhaust duct 30 and rotating joint 50 connected to a cut-away portion of exhaust duct liner 32. Adjustable cable assembly 46 includes cable 52, which connects connector assembly 48 with rotating joint 50. Connector assembly 48 includes shaft 54, oblong spacer 56, washer 58 and nut 60. Shaft 54 includes wrenching feature 62, and oblong spacer 56 includes flange 64. Rotating joint 50 includes ball 66, collar 68 and housing 70. Housing 70 includes sidewall 72, end wall 74, retention slot 76 and access opening 78.

Figure 3:
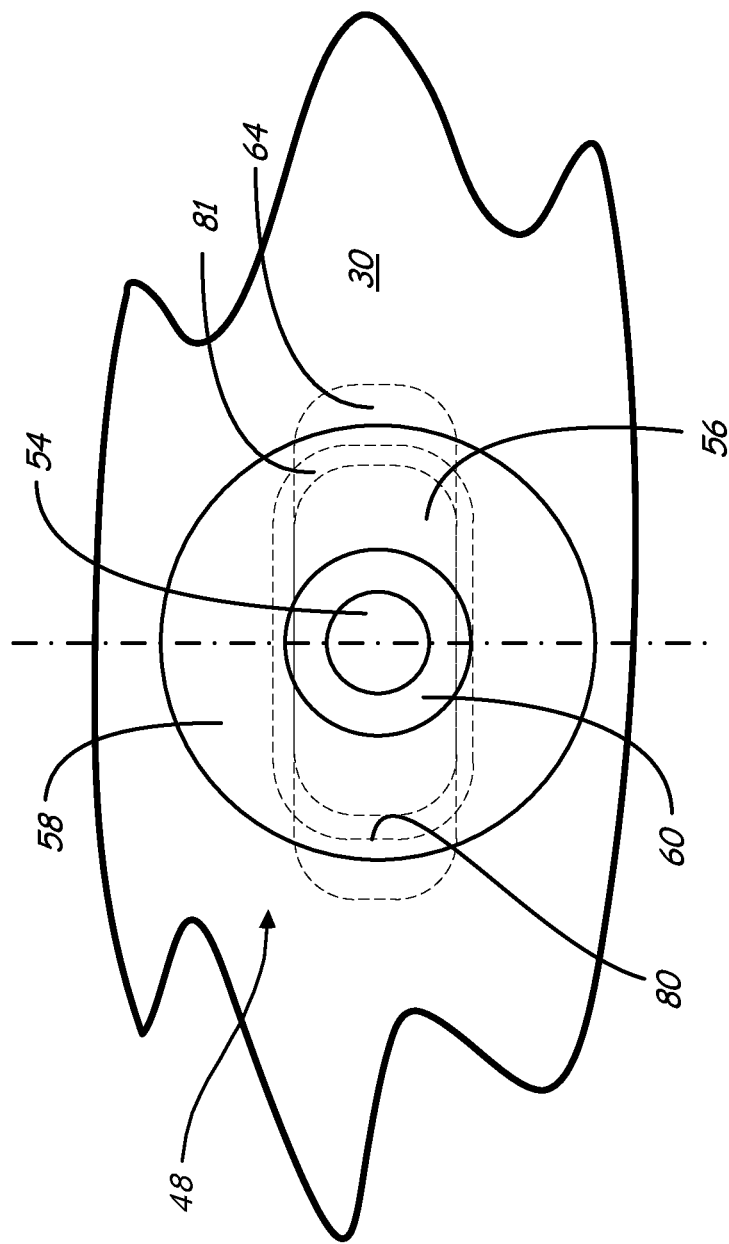
FIG. 3 is a top view of the connector assembly of FIG. 2 showing an interface between an oblong slot in the exhaust duct and an oblong spacer on the connector assembly.

Oblong spacer 56 of connector assembly 48 is positioned into oblong slot 80 in exhaust duct 30. Flange 64 is positioned inside exhaust duct 30 and has an outer edge that is wider (with reference to FIG. 2) than oblong slot 80. Specifically, flange 64 is longer than oblong spacer 56 in the longer direction of oblong spacer 56, as shown in FIG. 3. O-ring 81 is positioned around oblong spacer 56 adjacent flange 64. In one embodiment, flange 64 and oblong spacer 56 are made from a single piece by any suitable manufacturing method. In other embodiments, flange 64 comprises a plate or ring welded to oblong spacer 56. O-ring 81 may have a circular cross-sectional profile or an L-shaped cross-sectional profile as shown in FIG. 2. Shaft 54 is threaded into threaded bore 82 in oblong spacer 56 such that wrenching feature 62 extends to the exterior of exhaust duct 30. Bore 84 in washer 58 is positioned around shaft 54 and nut 60 is threaded onto shaft 54. Shaft 54 is, therefore, long enough to extend through flange 64, oblong spacer 56, washer 58 and nut 60, while also accommodating collar 85 for attachment with cable 52.

Ball 66 of rotating joint 50 is connected to housing 70 at exhaust duct liner 32. Specifically, ball 66 is inserted into opening 78 so as to be disposed between liner 32 and end wall 74. Opening 78 is wider and taller than ball 66 so as to permit entry of ball 66 into housing 70. Collar 68 extends from ball 66 so as to extend through slot 76. Slot 76 is wider than collar 68, but narrower than ball 66 so as to prevent ball 66 from passing through slot 76. Cable 52 is inserted into and coupled with sockets inside collar 68 and collar 85 to join connector assembly 48 with rotating joint 50, thereby tethering exhaust duct liner 32 to exhaust duct 30.

The radial position of shaft 54 with respect to housing 70 can be adjusted by rotating wrenching feature 62. Wrenching feature 62 comprises a hex head in the embodiment shown, but may comprise other torque transmitting features such as a pair of slab sides. In particular, shaft 54 is backed out of bore 82 to bring ball 66 into engagement with end wall 74 and slot 76 thereby putting cable 52 into tension. Nut 60 is tightened down on shaft 54 against washer 58 to immobilize shaft 54 with respect to oblong spacer 56 after shaft 54 is adjusted to the desired position. Nut 60 may comprise a conventional nut or a self-locking nut. Housing 70 can be shaped, as will be discussed with reference to FIGS. 4A and 4B, so as to permit secure, rotational engagement with ball 66 when cable 52 is in tension.

FIG. 3 is a top view of connector assembly 48 of FIG. 2 showing the interface between oblong slot 80 in exhaust duct 30 and oblong spacer 56, including flange 64, connected to shaft 54. Oblong spacer 56, flange 64 and oblong slot 80 are shown in phantom under washer 58 in FIG. 3 to show their relationship to duct 30. In the embodiment shown, washer 58 comprises a circle having a diameter larger than the widest portion of oblong slot 80. Shaft 54 extends through bore 84 (FIG. 2) of washer 58 so that nut 60 can be attached to shaft 54. Nut 60, therefore, acts as a stop to prevent shaft 54 from passing through washer 58 and into exhaust duct 30. In other embodiments, washer 58 may be non-circular or have other geometries so as to prevent passage of washer 58 through oblong slot 80.

Shaft 54 is also threaded into threaded bore 82 (FIG. 2) of oblong spacer 56, which is disposed within oblong slot 80. Oblong spacer 56 is elongated so as to prevent rotation relative to exhaust duct 30, thereby facilitating rotation and threading of shaft 54 into oblong spacer 56. Oblong spacer 56 is smaller than oblong slot 80 to facilitate assembly of connector assembly 48 with exhaust duct 30, as will be discussed later. Flange 64 is, however, wider than oblong slot 80 in at least one dimension to prevent dislodgement of oblong spacer 56. Oblong spacer 56 and oblong slot 80 are shown having oval profiles in the described embodiment. However, oblong spacer 56 and oblong slot 80 can have any geometry that prevents relative rotation between the two features when torque is applied to shaft 54. For example, each feature may be rectangular or hexagonal. Each feature need not have mating shapes. For example, oblong spacer 56 may be oval with oblong slot 80 being rectangular.

O-ring 81 surrounds oblong spacer 56 and fills the gap present by the difference in size between oblong spacer 56 and oblong slot 80. O-ring 81 prevents transfer of secondary air $A_S$ (FIG. 1) from exhaust duct 30 through oblong slot 80 and out of exhaust system 26 (FIG. 1). For example, the interior of exhaust duct 30 is typically pressurized compared to the exterior of exhaust duct 30 due to the presence of secondary air $A_S$ flowing through exhaust duct 30. O-ring 81 is compressed against exhaust duct 30 by tightening of nut 60 on shaft 54 against washer 58. Assembled as such, shaft 54 is prevented from passing through oblong slot 80 by nut 60 and washer 58, but the radial position of shaft 54 relative to washer 58 can be adjusted by loosening nut 60 and rotating shaft 54 relative to oblong spacer 56. In particular, shaft 54 is extended further into exhaust duct 30 to facilitate assembly of ball 66 into housing 70 (FIG. 2), and retreated further out of exhaust duct 30 to put cable 52 (FIG. 2) into tension.

FIG. 4A is a top view of rotating joint 50 of FIG. 2 showing ball 66 engaging retention slot 76 in housing 70. FIG. 4B is a side view of rotating joint 50 of FIG. 2 showing ball 66 inserted into access opening 78 in housing 70. FIGS. 4A and 4B are discussed concurrently. Housing 70 includes side wall 72, end wall 74, retention slot 76, access opening 78 and feet 86A and 86B. Ball 66 and collar 68, which includes socket 88, are coupled to housing 70.

Side wall 72 comprises a hollow cylindrical body that has a diameter slightly larger than that of ball 66. Side wall 72 extends radially outward from feet 86A and 86B, which comprise flat plates for joining to exhaust duct liner 32 (FIG. 2). For example, feet 86A and 86B may include bores through which liner fasteners or studs can be inserted. Alternatively, feet 86A and 86B can be welded to an exhaust duct liner. In the disclosed embodiment, feet 86A and 86B provide housing 70 with a generally rectangular footprint, but may have other footprints such as square, oval or round. End wall 74 comprises a semi-spherical dome having a diameter slightly larger than that of ball 66. Side wall 72, end wall 74 and feet 86A and 86B may be integrally formed or may be welded together. For example, side wall 72, end wall 74 and feet 86A and 86B may be stamped and machined from a steel plate.

Opening 78 extends across side wall 72 to provide an opening large enough to receive ball 66. In the embodiment shown, opening 78 accounts for half of side wall 72 by encompassing the entire width of side wall 72. Opening 78 is additionally at least as tall as ball 66. Thus, ball 66 can be moved through opening 78 so as to be between opposing portions of sidewall 72. Slot 76 extends across a portion of end wall 74 to permit collar 68 and, when inserted into socket 88, cable 52 (FIG. 2) to extend radially from housing 70 toward connector assembly 48. Slot 76 extends to the furthest radial extent of end wall 74 relative to feet 86A and 86B. Slot 76 thus sweeps through an angle slightly larger than ninety degrees on the semi-spherical dome of end wall 74. Slot 76 is also slightly wider than collar 68 to permit rotation of ball 66 within end wall 74.

Housing 70 may have other shapes and geometries as compared to those shown and described in FIGS. 4A and 4B. For example, ball 66 may comprise a cubic stop that fits into a rectilinear housing. However, in any embodiment, housing 70 permits axial or circumferential (with respect to the centerline of engine 10 in FIG. 1) insertion of ball 66 into the interior of housing 70, while restricting radial displacement of ball 66 from the interior of housing 70 after insertion. Further, after insertion of ball 66 into the interior of housing 70 and tensioning of cable 52 (FIG. 2), end wall 74 prevents axial and circumferential movement of ball 66 so as to prevent disassembly of rotating joint 50.

Figure 5:
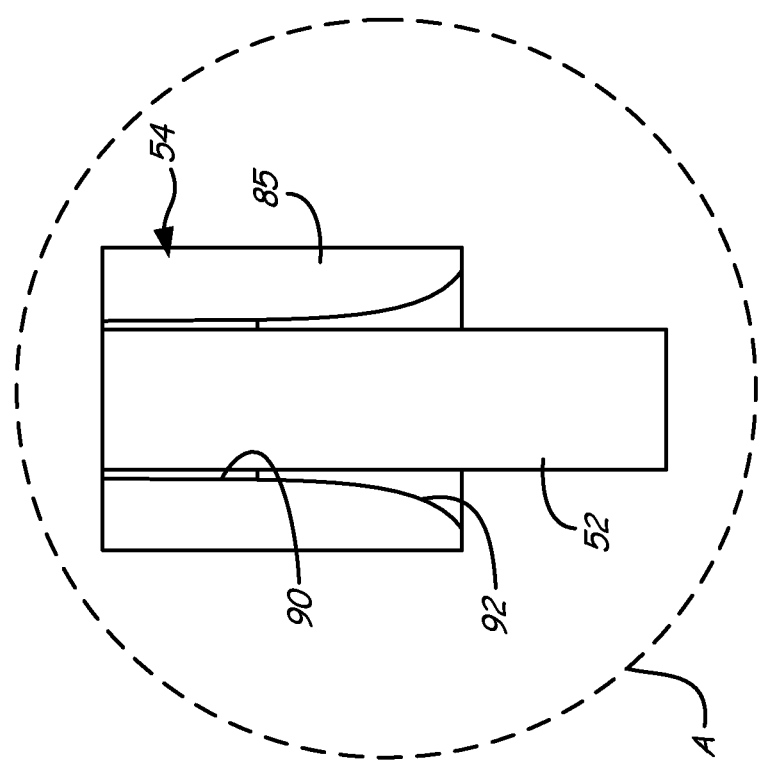
FIG. 5 is a close-up of callout A of FIG. 2 showing a cross-sectional view of a collar used to connect a cable to the connector assembly and the rotating joint.

FIG. 5 is a close-up of callout A of FIG. 2 showing a cross-sectional view of collar 85 that connects cable 52 to connector assembly 48 of FIG. 2. Collar 85 comprises a cylindrical body having cylindrical socket 90. The configuration of collar 85 and socket 90 shown in FIG. 5 is also exemplary of collar 68 and socket 88 shown in FIG. 4B used to join cable 52 to ball 66. Cable 52 is inserted into collar 85 such that a length of cable 52 extends across a mating length of socket 90. Collar 85 and cable 52 are thereby provided with suitable parallel surface areas to provide coupling between the two bodies. In one embodiment, collar 85 and cable 52 are mechanically joined, such as with a swaged joint. In other embodiments, cable 52 and collar 85 are metallurgically joined, such as with a welded joint. Such joints, as are known in the art, provide couplings having tensile strengths at least as great as the cable to which they are joined. In the present invention, socket 90 includes contouring 92 to prevent damaging of cable 52 when exhaust duct liner 32 shifts axial or circumferential position. In the embodiment shown, contouring 92 comprises a flared or funnel shape that allows cable 52 to bend from collar 85 without extending across a sharp inflection point, such as the edge of socket 90, thereby eliminating a stress point in cable 52. As such, cable 52 is less likely to degrade or fail during operation of hanger 12.

With reference to FIG. 2, in order to assemble adjustable cable assembly 46 with exhaust duct 30 and exhaust duct liner 32, housing 70 is first pre-assembled to exhaust duct liner 32. Exhaust duct liner 32 is then inserted into exhaust duct 30 such that housing 70 roughly aligns with oblong slot 80 in exhaust duct 30. Shaft 54, cable 52, collar 68 and ball 66 are also pre-assembled into a single component. For example, collar 68 and ball 66 are typically cast or machined from a single piece. Likewise, shaft 54, collar 85 and wrenching feature 62 are cast or machined from a single piece. Cable 52 is then joined to collar 68 and collar 85 such that a single piece unit is formed. Shaft 54 is then threaded into oblong spacer 56 to form a sub-assembly.

From the outside of exhaust duct 30, ball 66 is inserted through oblong slot 80 by grasping onto shaft 54. Shaft 54 is rotated so that one end of oblong spacer 56 and flange 64 can be inserted through oblong slot 80. As indicated above, oblong slot 80 is larger than oblong spacer 56 to facilitate such entry. Further, the oblong shapes of slot 80 and spacer 56 ease the entry of shaft 54 into oblong slot 80 while attached to spacer 56. Shaft 54 can then be rotated again to insert the second end of oblong spacer 56 through oblong slot 80 and bring flange 64 toward duct 30 at a later step in the assembly process. Ball 66 is moved into access opening 78 by movement of shaft 54. Cable 52 is generally of sufficient diameter and stiffness to enable fine manual movements of ball 66. Cable 52 is also sufficiently stiff such that, once ball 66 is inside housing 70, shaft 54 can be released and shaft 54 will remain extended through slot 80. Washer 58 is positioned onto shaft 54 and nut 60 is threaded onto shaft 54. Nut 60 is not threaded down to engage washer 58 at this time. Shaft 54 is manually pulled outward, ensuring that ball 66 engages end wall 74, to bring oblong spacer 56 into oblong slot 80 and flange 64 into engagement with exhaust duct 30.

At this point, the relative radial position of oblong spacer 56 with respect to exhaust duct 30 is checked to determine if shaft 54 needs to be further threaded into or out of oblong spacer 56. Shaft 54 is threaded into a position that is predetermined to induce a desired amount of tension in cable 52. For example, shaft 54 can be threaded into oblong spacer 56 so that oblong spacer 56 is a distance below the outer diameter surface of exhaust duct 30. Then, nut 60 is tightened to bring the top of oblong spacer 56 into level alignment with the outer diameter surface of exhaust duct 30, thereby stretching cable 52 and inducing a desired amount of tensile stress. Oblong spacer 56 is of a suitable thickness such that when washer 58 lies flat across oblong spacer 56 and exhaust duct 30 with nut 60 fully threaded, flange 64 will compress O-ring 81 to cause a sufficient seal.

During operation of turbofan engine 10 (FIG. 1), various temperature gradients within exhaust system 26 (FIG. 1) produce local stresses and strains within liner 32. Liner 32 is thereby subject to local distortions and displacements. Cable 52 and rotating joint 50 of the present invention prevent additional stress and strain from hanger 12 from being induced in liner 32. However, cable 52 also permits hanger 12 to absorb radial tensile loading, such as when liner 32 moves away from duct 30. As liner 32 tends to deform from loading and thermal gradients, hangers 12 distributed circumferentially around liner 32 allow exhaust duct 30 to react those loads to maintain the shape of liner 32 without hangers 12 inducing their own strain into liner 32. For example, as liner 32 rotates clockwise and shifts left with reference to FIG. 2, rotating joint 50 permits the rotation while cable 52 permits the axial shifting. Cable 52 also permits circumferential movement as discussed above. Cable 52 neither pulls nor pushes on liner 32 to accommodate such movement due to the flexibility of cable 52. However, pulling of cables 52 on the underside of exhaust duct 30 will maintain radial spacing between exhaust duct 30 and liner 32, thereby retaining the shape of liner 32 and optimal performance.

Hanger 12 is a simple to use system that facilitates easy installation. With the present invention, the use of tools or rigging to assemble ball 66 and cable 52 is not required. Hanger 12 only requires a single ball joint, thereby reducing the weight, complexity and number of parts as compared to prior art designs. Cable 52, washer 58 and nut 60 comprise standard, off-the-shelf components thereby reducing the expense of hanger 12. Furthermore, the inherent flexibility of cable 52 and the rotatability of rotating joint 50 allow exhaust duct liner 32 to move in all directions, except for radially apart from each other, without inducing stress in exhaust duct liner 32.

The following are non-exclusive descriptions of possible embodiments of the present invention.

A hanger for use in a gas turbine engine exhaust system comprises: a connector assembly for connecting to an exhaust duct of the gas turbine exhaust system; a bracket for connecting to an exhaust duct liner of the gas turbine exhaust system; and a cable extending from the connector assembly to the bracket.

The hanger of the preceding paragraph can optionally include, additionally and/or alternatively, any one or more of the following features, configurations and/or additional components:

A hanger wherein the connector assembly comprises: a shaft to which the cable is connected; a washer having a bore through which the shaft extends; and a nut coupled to the shaft.

A hanger further comprising an oblong spacer into which the shaft is threaded.

A hanger wherein the oblong spacer includes a flange having a width larger than that of the oblong spacer.

A hanger wherein the connector assembly further comprises an o-ring around the oblong body.

A hanger wherein the shaft includes a socket into which the cable is inserted.

A hanger wherein the socket is flared away from the cable.

A hanger wherein the shaft includes a wrenching feature distally opposite the socket.

A hanger wherein the cable includes a ball for connecting to the bracket.

A hanger wherein the bracket comprises a housing having an access port for receiving the ball.

A hanger wherein the housing comprises: a first wall for connecting to the exhaust duct liner; an opening extending through the first wall; a second wall connected to the first wall; and a slot disposed in the second wall, the slot having a width less than a width of the opening.

A suspension system comprises: an exhaust duct of a gas turbine engine; an exhaust duct liner disposed within the exhaust duct; a shaft connected to an opening in the exhaust duct; a cable extending from the shaft into the exhaust duct; and a bracket connected to the exhaust duct liner and the cable.

The suspension system of the preceding paragraph can optionally include, additionally and/or alternatively, any one or more of the following features, configurations and/or additional components:

A suspension system further comprising: a nut coupled to the shaft outside of the exhaust duct.

A suspension system further comprising: a washer disposed between the nut and the exhaust duct.

A suspension system further comprising: a spacer disposed in the opening in the exhaust duct and through which the shaft extends.

A suspension system further comprising a flange extending from the spacer beyond a perimeter of the opening.

A suspension system further comprising an o-ring surrounding the spacer between the flange and the exhaust duct.

A suspension system wherein the cable includes a stop for connecting to the bracket.

A suspension system wherein the bracket comprises: a first wall connected to the exhaust duct liner; an opening extending through the first wall, the opening having a first width wider than the stop; a second wall connected to the first wall; and a slot disposed in the second wall, the slot having a second width narrower than the stop.

An exhaust duct liner suspension system comprises: a shaft extending between first and second ends; a cable extending between first and second ends, the first end of the cable connected to the second end of the shaft; a stop connected to the second end of the cable; a spacer threaded onto the shaft; a nut threaded onto the shaft; and a washer positioned between the oblong spacer and the nut.

The exhaust duct liner suspension system of the preceding paragraph can optionally include, additionally and/or alternatively, any one or more of the following features, configurations and/or additional components:

An exhaust liner suspension system wherein: the spacer includes a flange; and an o-ring is disposed around the spacer adjacent the flange.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A hanger comprising:
a connector assembly configured to be coupled to a first component;

a bracket configured to be coupled to a second component; and
a cable formed by a plurality of wires bound together that extend from the connector assembly to the bracket, wherein the cable is placed in tension to support the second component relative to the first component;
a collar extending through a slot formed in the bracket, wherein the collar defines a collar socket, and wherein the cable is inserted into the collar socket to join the cable to the collar;
a ball extending from the collar opposite the collar socket and adapted to couple the cable to the bracket;
wherein:
the ball permits the cable to pivot about the ball relative to the bracket;
the connector assembly restrains rotation of the cable relative to the first component; and
wherein the connector assembly comprises:
a shaft extending outward through an opening in the first component, the shaft comprising:
a shaft socket into which the cable extends;
a wrenching feature distally opposite the shaft socket; and
external threads disposed along at least a portion of the shaft.

2. The hanger of claim 1, wherein the cable permits circumferential and axial displacement of the second component relative to the first component, and wherein the cable restrains movement of the second component relative to the first component in a first direction that increases tension within the cable and permits movement of the second component relative to the first component in a second direction that decreases tension within the cable.

3. The hanger of claim 1, the connector assembly further comprising:
an oblong spacer into which the shaft is threaded, wherein the oblong spacer is adapted to be received within the opening of the first component;
a flange coupled to the oblong spacer and disposed on a radially inner side of the first component;
a nut having internal threads that couple to the external threads of the shaft; and
a washer disposed between the nut and a radially outer side of the first component.

4. The hanger of claim 3, wherein the shaft socket is flared away from the cable.

5. The hanger of claim 3, the connector assembly further comprising an o-ring disposed around the oblong spacer adjacent the flange.

6. The hanger of claim 1, the bracket further comprising:
an access port for receiving the ball;
a first wall for connecting to the second component;
the access port extending through the first wall;
a second wall connected to the first wall; and
the slot formed in the second wall, the slot having a width less than a width of the access port.

7. A gas turbine engine exhaust system comprising a plurality of hangers, each hanger comprising:
a connector assembly connected to an exhaust duct of the gas turbine exhaust system;
a bracket connected to an exhaust duct liner of the gas turbine exhaust system; and
a cable formed by a plurality of wires bound together, the cable extending from the connector assembly to the bracket, wherein the cable is placed in tension to support the exhaust duct liner relative to the exhaust duct, and wherein displacement of the exhaust duct liner relative to the exhaust duct is permitted at each hanger in a first radial direction that decreases tension in the cable and is restrained in a second radial direction that increases tension in the cable, and wherein the plurality of hangers are circumferentially spaced in the gas turbine exhaust system.

8. The gas turbine engine exhaust system of claim 7, wherein each connector assembly comprises:
a shaft to which the cable is connected;
a washer having a bore through which the shaft extends; and
a nut coupled to the shaft.

9. The gas turbine engine exhaust system of claim 8, wherein each connector assembly further comprises:
an oblong spacer into which the shaft is threaded.

10. The gas turbine engine exhaust system of claim 9, wherein each oblong spacer includes a flange having a width larger than a width of the oblong spacer.

11. The gas turbine engine exhaust system of claim 10, wherein each connector assembly further comprises an o-ring around the oblong spacer.

12. The gas turbine engine exhaust system of claim 8, wherein each shaft includes a socket into which the cable is inserted.

13. The gas turbine engine exhaust system of claim 12, wherein each socket is flared away from the cable.

14. The gas turbine engine exhaust system of claim 12, wherein each shaft includes a wrenching feature distally opposite the socket.

15. The gas turbine engine exhaust system of claim 7, wherein each cable includes a ball for connecting to the bracket.

16. The gas turbine engine exhaust system of claim 15, wherein each bracket comprises a housing having an access port for receiving the ball.

17. The gas turbine engine exhaust system of claim 15, wherein each housing comprises:
a first wall for connecting to the exhaust duct liner;
the access port extending through the first wall;
a second wall connected to the first wall; and
a slot disposed in the second wall, the slot having a width less than a width of the access port.

18. An exhaust duct support system comprising:
an exhaust duct;
an exhaust duct liner;
a plurality of hangers circumferentially spaced about the exhaust duct liner and extending from the exhaust duct to the exhaust duct liner; each hanger comprising:
a shaft extending between a first end and a second end and having an external thread;
a cable formed by a plurality of wires bound together that extend between a first end and a second end, the first end of the cable connected to the second end of the shaft;
a stop connected to the second end of the cable, wherein the stop is affixed to the exhaust duct liner;
a spacer having an internal thread that engages the external thread of the shaft;
a nut engaging the external thread of the shaft; and
a washer positioned between the spacer and the nut,
wherein each hanger permits axial and circumferential displacement of the exhaust duct liner relative to the exhaust duct, and
wherein each hanger permits displacement of the exhaust duct liner relative to the exhaust duct in a first radial direction that decreases tension in the cable and restrains displacement of the exhaust duct liner relative to the exhaust duct in a second radial direction that increases tension in the cable.

19. The exhaust duct support system of claim 18, wherein:

the spacer includes a flange; and an o-ring is disposed around the spacer adjacent the flange.

* * * * *